(12) United States Patent
Krebaum

(10) Patent No.: US 6,265,519 B1
(45) Date of Patent: Jul. 24, 2001

(54) THIOLAMIDE CURING AGENTS

(75) Inventor: Paul Krebaum, Lisle, IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 09/206,821

(22) Filed: Dec. 8, 1998

(51) Int. Cl.$^7$ .................................................. C08G 59/68
(52) U.S. Cl. ............................. 528/90; 528/99; 528/403; 528/408; 528/411
(58) Field of Search ............................. 528/90, 99, 403, 528/408, 411

(56) References Cited

U.S. PATENT DOCUMENTS

| | | |
|---|---|---|
| 3,492,269 | 1/1970 | Janssen et al. . |
| 4,696,992 | 9/1987 | Goel ........................................ 528/90 |
| 4,894,431 | 1/1990 | Armbruster et al. .................... 528/90 |
| 5,214,098 | 5/1993 | Setiabudi et al. ...................... 525/109 |
| 5,310,826 | 5/1994 | Giovando .............................. 525/438 |
| 5,688,877 | 11/1997 | Koenig et al. ......................... 525/526 |
| 5,703,138 | 12/1997 | Cantor et al. ........................... 522/29 |
| 5,712,321 | 1/1998 | Cantor et al. ........................... 522/28 |
| 5,747,599 | 5/1998 | Ohnishi ............................... 525/327.3 |
| 5,753,722 | 5/1998 | Itokawa et al. ......................... 522/83 |

FOREIGN PATENT DOCUMENTS

568993 * 1/1959 (CA) ........................................ 528/90

* cited by examiner

Primary Examiner—Bernard Lipman
(74) Attorney, Agent, or Firm—Robert A. Yesukevich

(57) ABSTRACT

The present invention relates to thiolamide curing agents and methods for their preparation and use. The thiolamide curing agents are the reaction product of a thiol containing compound and an amine containing compound.

6 Claims, No Drawings

THIOLAMIDE CURING AGENTS

FIELD OF INVENTION

The present invention relates to thiolamide curing agents and methods for their preparation and use. More particularly, this invention provides thiolamide curing agents that have increased pot life and can be cured at a variety of times and temperatures using a wide range of catalysts and catalyst amounts.

BACKGROUND OF THE INVENTION

Many coatings, adhesives and sealants are formed by effecting the polymerization of a suitable monomer. The physical properties of the final product, the stability of the reagents in storage and the rate of curing under a given set of conditions can be greatly effected by the choice of curing agent that is utilized for crosslinking. Many monomers/resins have epoxide functional groups and/or unsaturated bonds that can participate in polymerization and crosslinking. Resins with epoxide functional groups are very useful due to their ability to bond together metals and many other substances extremely well. They form strongly adherent coatings and are widely used in applications as diverse as gluing together aircraft parts to coating electronic circuit boards.

Curing agents that themselves become a part of the polymerized product, usually by forming crosslinkages, are also known as hardeners. The extent of such crosslinkages and their nature often control the bulk properties, such as resistance to tensile or shear stress, water resistance and the like, of the polymerized product.

An important class of curing compounds have amine functional groups. Epoxy groups react at ambient temperatures with primary aliphatic amines to form secondary amines and with secondary amines to form tertiary amines. Reaction rates depend on epoxy and amine structure and concentration. Terminal epoxy groups, such as glycidyl ether and esters, are generally more reactive than internal epoxy groups, which are more sterically hindered. Reactivity of amines tends to increase with base strength and decrease with steric crowding. Generally, aliphatic amines are more reactive than aromatic amines, which are much less basic.

Often times, functional groups such as amines, in particular primary aliphatic amines, are too reactive and difficult to control in reactions with epoxide monomers at ambient temperatures. Thus, two package systems are commonly employed so that the epoxide resin is stored separately from the amine-curing agent. This results in the need for dual container packaging and limited pot life.

The structure of the amine-curing agent, e.g., the length of the molecule and the number of amine functional groups available on each molecule, affect the final properties of the product. In addition, the ratio of the curing agent to the monomers and the presence of fillers, if any, also affects the final product. For instance, curing agents with aromatic amines may produce a product with better thermal properties while curing agents comprising aliphatic poly-amines may provide products with superior flexibility. Other properties of interest are adhesive strength, especially in the use of epoxy resins, peel strength, tensile and shear strength, hardness and scratch resistance, nature of materials bonded, thermal expansion, creep, heat resistance, water resistance, dielectric strength, strains introduced due to the curing process, and, of course, cost, color and compatibility.

Amine-curing agents are available in a variety of forms for different applications. Therefore, there is a need for curing agents that retain the advantages of the availability of, and the experience gained with, amine-curing agents while permitting greater control over storage and the rate of curing. Preferably, such improved curing agents should be available at a low cost and in a variety of structural forms.

One of the desirable alternative functional groups for the purpose of affording control over the curing rate and storage properties of curing agents is the thiol group because its reaction rates can be readily controlled. The use of curing agents with thiol functional groups (thiol-curing agents) is known. However, unlike amine-curing agents, synthesis limitations make it difficult to make a wide variety of curing agents with thiol functional groups. Furthermore, preparation of curing agents with thiols also results in the release of offensive odors.

U.S. Pat. No. 3,318,974 discloses a method for curing unsaturated polyesters with peroxides in the presence of thioglycolic acid. Another U.S. Pat. No. 3,291,716 describes the use of thiol containing compounds in the curing of epoxy resins. Thus, while curing unsaturated resins and epoxide resins with thiol containing compounds is described, the choice of such compounds is limited due to difficulties in efficient synthesis. Although mixtures of thiol containing compounds (e.g. trimethylol propane trimercaptopropionate) with amines are known curing agents, there is no substantial reaction between these compounds to produce thioglycolamides. That is, they co-cure as separate entities with the epoxide.

It is an object of the present invention to overcome the drawbacks of amine-curing agents while retaining the advantages associated with amine-curing agents by making possible suitable thiol-curing agents.

It is an objective of the present invention to provide a method for preparing curing agents that cure through thiol groups.

It is another objective of the invention to provide a method for preparing a curing agent with thiol groups from compounds having at least one amine group.

It is a further object of the invention to provide curing agents whose rate of curing can be controlled to provide desired properties such as viscosity, storage and extent of curing.

SUMMARY OF THE INVENTION

The present invention is directed to thiol functional amide curing agents and methods for their preparation and use. The thiol functional amide curing agents of the present invention are useful as curing agents for a wide variety of resins, including adhesives and sealants. In an important aspect, the curing agents of the present invention have increased pot life and can be cured at a variety of times and temperatures using a wide range of catalysts and catalyst amounts. Further, the curing agents of the invention have excellent thermal and oxidative stability and provide adhesives and sealants with improved properties of flexibility and elongation. Importantly, the use of the thiol functional amide curing agents of the present invention is not accompanied by the offensive odors commonly associated with sulfur containing compounds.

In an important aspect, the present invention provides a thiol functional amide curing agent having the general formula

(1)

wherein $R^1$ is selected from the group consisting of polyoxalkylene, alkyl, alkyl having additional amine groups, alkenyl, alkenyl having additional amine groups, aromatic, cycloalkane, cycloalkene, cyclic compounds which include $R^1$ as part of the ring, and mixtures thereof; wherein $R^2$ is selected from the group consisting of an alkyl, alkenyl, aromatic, cyclic compounds which include $R^2$ as part of the ring, and mixtures thereof, and wherein $R^5$ is selected from the group consisting of alkyl, alkyl having additional amine groups, alkenyl, alkenyl having additional amine groups, aromatic, cycloaliphatic, hydrogen, and mixtures thereof. In a very important aspect, $R^1$ includes a polyalkylene oxide backbone with one or more additional aminogroups, preferably located near the chain ends.

In another important aspect, the present invention provides a method for preparing thiol functional amide curing agents. In accordance with the method of the invention, a compound with at least one thiol group and one carbonyl group is reacted with a compound having at least one amine group. The thiol containing compound may be in the form of a thiol functional acid, ester, halide, anhydride or other acyl derivative or thioacetyl derivative. The amine containing compound has at least one amine but may have additional amines and additional functional groups. In a very important aspect of the invention, the molar ratio of thiol group containing compounds to amine group containing compounds is about 2:1 to about 1:2.

In yet another important aspect, thiol functional amide curing agents of the present invention are provided substantially without free amines. Thiol functional amide curing agents without free amines are stable when stored under neutral to slightly acidic conditions even when mixed with resins, such as epoxide resins, thus prolonging the pot life. The relative amount of strong base controls the rate of the reaction thus providing flexibility in selecting curing times. The disulfide bonds that can be formed between thiols upon oxidation allow for additional crosslinks. In one embodiment, the curing agent can be mixed with a weak acid strong base combination and suitable monomers/resin. Curing may be achieved up on heating which results in dissociation of the weak acid releasing the strong base to catalyze the curing via the thiol functional groups.

DETAILED DESCRIPTION OF THE INVENTION

The present invention provides a wide array of thiol functional amide curing agents and methods for their production such that the choices of structures available in curing agents curing through thiol functional groups are substantially equivalent to those possible with curing agents curing through amine groups. Hence, the present invention makes the wide variety of amine functional and backbone chemistries available in thiol functionalized chemistries. Furthermore, hybrid curing agents with both amine and thiol groups are also made possible by this invention.

Another important advantage provided by the composition of the present invention is a reduction in the functionality of the resin. The thiol functional amide curing agents of the present invention provide a lower crosslink density than conventional amine-cure chemistries. The lower crosslink density allows for the preparation of substantially long linear polymer chains which enables the preparation of elastomeric polymers.

In an important aspect, thiol functional amide curing agents of the present invention are prepared by reacting a compound having at least one thiol group and one carbonyl group with a compound having at least one amine group.

Thiol Containing Compounds

Compounds having at least one thiol group which are useful in the present application include compounds having the following general formula

(2)

wherein $R^2$ is defined as above and $R^3$ is selected from the group consisting of hydrogen, alkyl, alkenyl, aromatic, and cycloaliphatic groups, and $R^4$ is S or O.

In an important aspect of the invention, compounds having the general formula (2) include

(3)

where $R^3$ is defined as above and x=1 to 12; and in a very important aspect $R^3$ is H and x=1 or 2.

In an alternative aspect of the invention, the thiol containing compound may include compounds such as

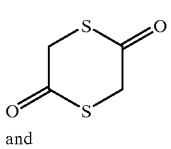
(4)

and

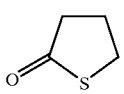
(5)

In a very important aspect of the invention, the thiol containing compounds are thioglycolic acid and/or its esters and thiopropionic acid and/or its esters.

Amine Containing Compounds

Compounds having at least one amine group which are useful in the present invention include compounds having the following general structure

(6)

wherein $R^1$ may contain additional primary or secondary amine groups and is selected from the group consisting of polyoxalkylene, alkyl, alkyl having additional amine groups, alkenyl, alkenyl having additional amine groups, aromatic, cycloakane, cycloalkene, cyclic compounds which include $R^1$ as part of the ring, and mixtures thereof, and $R^5$ is selected from the group consisting of alkyl, alkyl having additional amine groups, alkenyl, alkenyl having additional amine groups, aromatic, cycloaliphatic, hydrogen, and mixtures thereof.

In an important aspect of the invention, the amine group need not exclusively be a primary amine, as the amine containing compound may include additional amine groups.

An example of a secondary amine such as a $R^1R^5NH$ compound useful in the present invention may include the following.

(7)

In a very important aspect of the invention, the amine containing compound is any polyoxyalkylene amine of the Jeffamine® "D" and "T" series.

Preparation of Thiolamide Curing Agents

In another important aspect, the present invention provides a method for preparing thiol functional amide curing agents. The general reaction for the preparation of thiol functional amide curing agents is as follows.

(8)

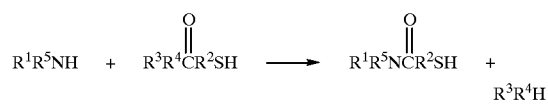

wherein $R^1$, $R^2$, $R^3$, $R^4$ and $R^5$ are as defined above.

Some exemplary reactions of amine and thiol containing compounds are as follows (9)

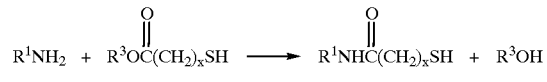

(10)

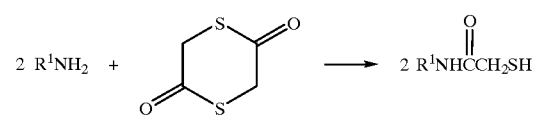

(11)

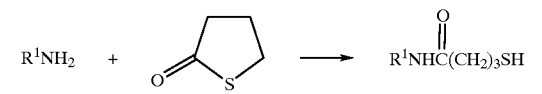

(12)

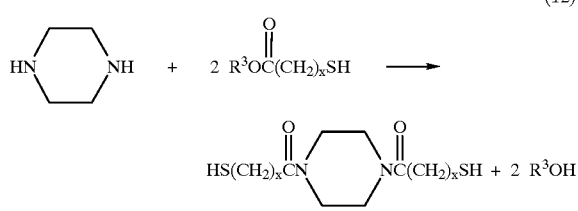

Where $R^6$ is a methylene, ethylene, propylene or other alkylene, aromatic, or cycloaliphatic radicle.

The formation of the thiolamide compounds may be aided by the use of catalysts and suitable conditions. The suitable catalysts are acids and titanium compounds. Some desulfurization (—$H_2S$) of the thiol precursors at high temperatures is promoted by acids, so titanate based catalysis is preferred. Tetraalkoxy titatanates of the formula $Ti(OR)_4$, where R is an alkyl group of 1–10 carbon atoms are preferred. Titanium chelates can also be used. Most preferred embodiments are marketed by Dupont under the Tyzor trademark. When the thiol containing compound is a thiol acid, it is best to add the titanium catalyst late in the reaction, preferably after ⅔ of the theoretical amount of water has been evolved. The catalyst may be attached to a solid support to carry out a continuous production process.

Unless activated esters (such as phenyl esters, thiol esters, etc.) are used, thioglycolic or thiopropionic acids are the preferred thiol containing compounds. This is due to the fact that aminolysis of simple esters proceeds well only at very high temperature (>180° C.) and that desulfurization (—$H_2S$) of the thiol becomes a competing reaction at this high temperature, at least with the Jeffamine® series of amines. Amines which are more reactive, such as piperidines, piperazines, primary amines should experience less difficulty reacting with a thiol containing ester. Diesters, such as ethylene glycol dimercapto acetate, display enhanced reactivity. The presece of the hydroxyl functional group (from partial aminolysis) or a cyclic transition state may contribute to the enhanced reactivity. Reactions using ethylene glycol diesters are conveniently carried out at reduced pressure to remove the ethylene glycol as formed.

Desulfurization of the reaction is minimized by minimizing the time-temperature profile that the reagents are exposed to during preparation of the curing agent. Because the reaction is difficult to catalyze, minimizing the time-temperature profile is most conveniently accomplished via an excess of one of the reagents and removal of byproducts to bring the reaction to completion.

Purity of the thiolamide curing agent is important if one desires to build high molecular weight polymer compositions especially if long linear chains are desired. The presence of unreacted thiol acids in the thiolamide curing agent is undesirable because it combines with the basic amine catalyst used for curing the epoxy compositions. It also prematurely terminates the polymer chain. The thiolamide curing agent of the invention preferably has a purity of at least about 90% thiolamide as determined by percentage of conversion. In an important aspect of the invention, the most convenient route to the purest product having the least amount of thiol acid in the thiolamide product was obtained by reacting stochiometric amounts of the reagents in the presence of a catalyst. However, this reaction proceeded slowly taking about 9 hours.

In an important aspect of the invention, reactions can be driven to completion by using an excess of one of the reagents. Specifically, product is obtained by reacting the amine with an excess of thiol acid, and a minimum of catalyst. The product obtained included unreacted thiol acid and suspected thiolesters byproduct. It is suspected that with equivalent catalysts reaction with an excess of acid will proceed more rapidly than with stochiometric quantities. Thin film stripping under high vacuum can be used to remove unreacted thiol acid. This approach minimizes the time-temperature profile of the product and concomitant degradation via loss of $H_2S$.

Curing of Epoxy Resins

In an important aspect of the invention, the thiolamide curing agent of the present invention may be used in connection with epoxy resins. Epoxy resin is a generic term used to refer to monomers with at least one epoxy group. In the present context, epoxy resin refers to monomers with at least two groups that can participate in polymerization and at least one of which is an epoxy group.

Some commonly used epoxy resins include epoxies prepared by the reaction of epichlorohydrin with bisphenol A, or with hydrogenated bisphenol A, or with bisphenol F, or with Novolac phenolic resins, or with polyols such as glycerol, sorbitol, polyethylene or polypropylene glycol.

As an example the structure of polyethylene glycol diglycidyl ether is shown below.

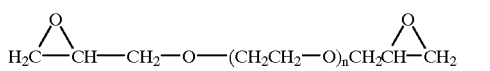
(14)

In addition, Shell EPON HPT 1076 and Ciba Araldite MY 0510 are examples of trifunctional epoxy resins.

The reaction of thiols with epoxies is very slow unless promoted by bases. Some useful bases include triethylamine, pyridines, tris(dimethylamino) phenol, diazabicyclo-octane, diazabicylononane, diazabicycloundecene (DBU). Often a weakly acidic substance such as a phenol or carboxylic acid can be used to extend pot life at room temperature. Upon heating, the weak acid dissociates and the base catalyzes the reaction of the thiol with the epoxy. In an important aspect, heating is conducted at about 60° C. to about 130° C. for about 1 to about 10 minutes.

Bi- or poly-functional thioglycolamides, prepared as described here, should preferably be stored under an inert atmosphere to minimize the risk of slow coupling and resultant increase in viscosity. Useful articles can be fabricated from thioglycolamides via the oxidative coupling reaction alone or in conjunction with other curing reactions, such as a mixed curing scheme with epoxy resin and an organic hydroperoxide comprising one side of a formulation and the thioglycolamide and an amine catalyst comprising the second half. The presence of hydrogen peroxide results in almost instantaneous coupling. More hindered organic peroxides and hydroperoxides may be used to get curing times from minutes to hours. However, this curing is due to the oxidative coupling of the thiols as opposed to coupling with the monomers/resin.

In making polysulfide rubbers, additionally, the monomers are mixed with an oxidizing agent such as $MnO_2$, air and the curing agent. Further additions may be made by adjusting the pH or catalyst levels to influence the rate of oxidation.

An example of a reaction of a thiolamide group and an epoxy group is shown below

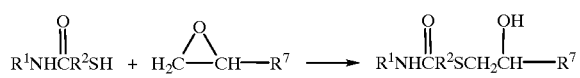
(15)

wherein $R^7$ is an alkylene, an aromatic or a cycloaliphatic.

In an important aspect of the invention, it is to be noted that not all of the amines have to be reacted to form amide linkages. Unreacted amino groups can also participate in the curing reactions because amine co-curing is compatible with the base-catalyzed reaction mechanism for the thiol and epoxide moieties, as is discussed below.

The new curing agent so obtained cures through the thiol functional groups in the presence of a base. The degree of cross-linking can be increased by utilizing epoxy polymers with relatively more epoxide functional groups or utilizing thiolglycolamides of higher functionality. One may also leave some of the amino groups on the amine containing compound unconverted to thioglycolamides or use additional stochiometric crosslinking agents (e.g. triethylene tetramine), catalytic crosslinking agents (e.g. methylimidizole) or any combination of the above.

Curing agents based on thiopropionic acid and longer chain derivatives display enhanced thermal and hydrolytic stability compared to the corresponding thioglycolic acid derivatives. Thiopropionamides display enhanced high temperature stability because the driving force leading to a type of "back biting" chain scission is less. Thermodynamically, self-hydrolysis to a 7 membered ring is less favored than that to a 6 membered ring.

A thioglycolamide-cured resin self-hydrolyzes as follows:

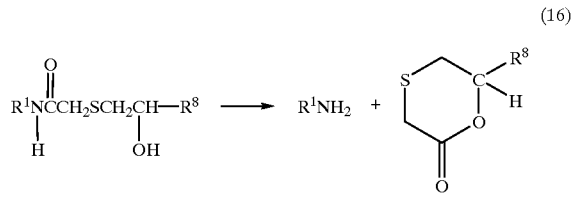
(16)

Wherein $R^8$ is an alkylene, aromatic or a cycloaliphatic.

Because of the great stability of the amide bond self-hydrolysis is ordinarily not a problem. The greater stability of the thiopropionamides only becomes apparent during long term performance testing at elevated temperatures (>1000 hours @ 125° C. or greater).

Curing Resins Containing Unsaturated Bonds

Thiol-curing agent can be used to polymerize and crosslink monomers with unsaturated bonds as well. Examples of such resins are acrylate-containing monomers. Additionally, monomers may have dual functionality, for instance with acrylic and epoxy moieties. An example of such a monomer is glycidyl methacrylate. When used with such monomers, the thiol groups can form linkages with both the epoxide and the unsaturated bonds available on the monomers, and possibly at different rates. The advantage of such a curing scheme can be in the control of the viscosity and flow properties at different times of the polymer as it cures.

The reaction of thiol-curing agents and unsaturated compounds with electron withdrawing groups, such as acrylates and methacrylates, can be extremely rapid (seconds) in the presence of a strong base. Acrylates cure many times faster than methacrylates, sometimes uncontrollably so. The reactions with ordinary olefins are much slower, but may still find use in curing rubber articles especially when combined with accelerators, catalysts, and free radical sources well known in the art. Similarly, the presence of amines can result in the reaction of the amines with the epoxide rings in addition to catalyzing the reaction with the thiol moiety. The product formed by polyfunctional curing agents and monomers can be a highly crosslinked insoluble mass.

The reaction of a curing agent with a thiolamide group and an unsaturated monomer is shown below

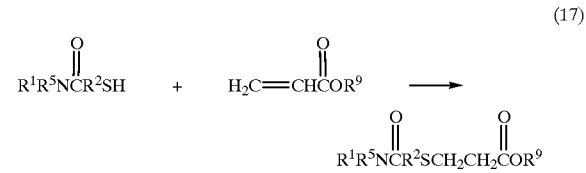
(17)

where $R^9$ is selected from the group consisting of hydrogen, alkyl, alkenyl, aromatic and cycloaromatic groups.

The following examples illustrate methods for carrying out the invention and should be understood to be illustrative of, but not limiting upon, the scope of the invention which is defined in the appended claims.

EXAMPLES

Example 1

Catalyst is made from a mixture of 1 mole Tyzor TBT (Titanium tetra butoxide) and 1 mole of anhydrous methane sulfonic acid, diluted to 44% by wt. in toluene. A 2 liter 3-neck flask is charged with 800 g Jeffamine T-3000 (now called Huntsman XTJ-509), 80 g of 3-mercaptopropionic acid and 150 ml. toluene. 1 neck is fitted with a Dean-Stark trap, one neck is fitted with a septum inlet, and the third neck is fitted with a nitrogen inlet. The flask is swept with nitrogen and the nitrogen is turned off. The flask is heated until approximately 9 ml of water has been collected in the Dean-Stark trap (~2–3 hrs). 1 ml of the preprepared TBT/MSA catalyst is added with a syringe through the septum inlet. Refluxing is continued until 13.4 ml of water has been collected (98% of theory), which takes an additional 5–6 hours. The resulting material was stripped of volatiles in-situ using a mechanical vacuum pump and a liquid nitrogen cooled vacuum trap. The material was allowed to cool and stored under nitrogen. 25 gms of the above resin, 3.5 g of Bis-F epoxy, and 0.5 g of Diazabicycloundecene sets to a gel within 10 minutes.

Example 2

Of Jeffamine D-400, 208 g, 1.01 M of thiopropionic acid and 0.1 g of ethylbenzene sulfonic acid are heated under Dean-Stark conditions in toluene until the theoretical amount of water is collected. The product is vacuum stripped and stored under nitrogen.

Example 3

Of bis-thiopropionamide of Jeffamine D-400, 236 g. are rapidly combined with a preformed mixture of 80 g of hexane diol dimethacrylate, 20 g trimethylolpropane trimethacrylate, 4 g DBU (diazabicycloundecene), 1 g Cab-O-Sil EH-5 fumed silica, and 1 g of hindered phenolic antioxidant/polymerization inhibitor. A relatively large amount of trifunctional crosslinker was used to compensate for the lack of purity in the difunctional compound, which leads to early chain termination. The product rapidly cures to a tough, rubbery, adherent polymer.

Example 4

Bis F epoxy resin (eew 170—174) is mixed with sufficient polypropylene glycol (425) dimercapto propionate to result in a net epoxide equivalent weight of 600. This unreacted mixture is loaded into the "1" side of a 1:2 ratio mixpack dual-syringe disposable dispenser. The thiopropionamide of Jeffamine T-3000 is mixed with 1% by wt. of aminoethylamino propyltrimethoxy silane and 3% by wt. of DBU. This is placed in the "2" side of the 1:2 ratio mixpack.

The mixpack is fitted with a 48 element static mixer and the product dispensed into a Teflon dogbone mold maintained at 80° C., using the handgun supplied with the mixpack. The mixture gels within 4 minutes. After cooling and demolding 15 minutes later the cured elastomer exhibits greater than 100% elongation. It exhbits excellent adhesion in a cohesive failure test when cured on unprimed aluminum.

Example 5

One-half amine equivalents of Jeffamine T-3000 (approximately 500 g), 1 mole of mercaptopropionic acid (106 g) and 150 ml of toluene were charged into a stirred 2l flask and refluxed with the aid of a Dean-Stark separator until the theoretical amount of water carried over (about 8 hrs). Of titanate catalyst 100–500 mg was added.

The product of this reaction was subjected to thin film stripping under vacuum (0.5 mm Hg range) with the aid of a falling film still to remove gross amounts of low-boiling material in-situ. Removal of 18.8 grams of mercaptopropionic acid was accomplished. Of mercaptopropionic thiolamide resin, 555.6 g remained which is more than the theoretical amount. The resin had a pH of 3 indicating that the acid was still present in the resin. I.R. spectroscopy indicated the presence of undesirable thiol acid by a peak at ~1734 $cm^{-1}$ substantially above base line. Visual inspection indicated that the product is lighter in color (revealing less degradation of the product). Restripping decreased the peak further.

This description is intended to disclose the modes for practicing the invention without limiting the scope of the invention to only the expressly disclosed modes. Permutations that would be apparent to one skilled in the art are included within the scope of the claimed invention.

What is claimed is:

1. A method for curing an epoxide with a thiol functional amide curing agent, the method comprising:

mixing a thiol functional amide curing agent composed essentially of thioglycolamide, thiopropionamide, or a mixture thereof with an epoxide and a basic catalyst to produce a reaction mixture; and heating the reaction mixture to a temperature in the range of about 20 degrees C. to about 130 degrees C.

2. A method according to claim 1 wherein the thiol functional amide curing agent is the reaction product of mercaptoglycolic acid and polyoxyalkalene amide.

3. A method according to claim 1 wherein the thiol functional amide curing agent is composed essentially of the reaction product of mercaptopropionic acid and polyoxyalkalene amide.

4. A method according to claim 1 wherein the reaction mixture is heated to the temperature for about 1 to about 10 minutes.

5. The method according to claim 1 wherein the epoxide is composed essentially of bisphenol F epoxy.

6. The method according to claim 1 wherein the basic catalyst is composed essentially of diazabicyclooctane, diazabicyclononane, diazabicycloundecene or a mixture thereof.

* * * * *